US007637983B1

(12) United States Patent
Liu et al.

(10) Patent No.: US 7,637,983 B1
(45) Date of Patent: *Dec. 29, 2009

(54) METAL ORGANIC FRAMEWORK—POLYMER MIXED MATRIX MEMBRANES

(75) Inventors: Chunqing Liu, Schaumburg, IL (US); Beth McCulloch, Clarendon Hills, IL (US); Stephen T. Wilson, Libertyville, IL (US); Annabelle I. Benin, Oak Forest, IL (US); Mark E. Schott, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 602 days.

This patent is subject to a terminal disclaimer.

(21) Appl. No.: 11/427,834

(22) Filed: Jun. 30, 2006

(51) Int. Cl.
B01D 53/22 (2006.01)
(52) U.S. Cl. .................... 95/45; 95/50; 95/51; 95/54; 95/55; 96/4; 96/12; 96/13; 96/14; 210/640; 210/500.21; 210/500.27
(58) Field of Classification Search ............ 95/45, 95/50, 51, 54, 55; 96/4, 11, 12, 13, 14; 210/640, 210/500.21, 500.27
See application file for complete search history.

(56) References Cited

U.S. PATENT DOCUMENTS

| | | | |
|---|---|---|---|
| 3,567,632 A | 3/1971 | Richter et al. ............. 210/23 |
| 4,230,463 A | 10/1980 | Henis et al. ................ 55/16 |
| 4,599,157 A * | 7/1986 | Suzuki et al. ................ 96/11 |
| 4,680,037 A * | 7/1987 | Ramprasad et al. ............ 95/44 |
| 4,705,540 A | 11/1987 | Hayes et al. ................ 55/16 |
| 4,728,345 A | 3/1988 | Murphy .................... 55/158 |
| 4,740,219 A | 4/1988 | Kulprathipanja et al. ..... 155/16 |
| 4,880,442 A | 11/1989 | Hayes et al. ................ 55/16 |
| 4,925,459 A | 5/1990 | Rojey et al. ............... 155/16 |
| 4,968,430 A | 11/1990 | Hildebrand et al. ......... 210/640 |
| 5,085,676 A | 2/1992 | Ekiner et al. ............... 55/158 |
| 5,104,532 A | 4/1992 | Thompson et al. .......... 210/224 |
| 5,127,925 A | 7/1992 | Kulprathipanja et al. ....... 55/16 |
| 5,176,724 A * | 1/1993 | Saito et al. .................. 96/13 |
| 5,288,304 A | 2/1994 | Koros et al. ................ 95/45 |
| 5,431,864 A | 7/1995 | Rao et al. ................ 264/29.5 |
| 5,447,559 A | 9/1995 | Rao et al. .................... 96/4 |
| 5,507,856 A | 4/1996 | Rao et al. .................... 95/50 |
| 5,538,536 A | 7/1996 | Fuentes et al. .............. 95/45 |
| 5,670,051 A * | 9/1997 | Pinnau et al. ................ 95/45 |
| 6,048,388 A | 4/2000 | Schwarz ................ 106/31.27 |
| 6,248,682 B1 | 6/2001 | Thompson et al. ............ 502/4 |
| 6,500,233 B1 | 12/2002 | Miller et al. ................ 95/50 |
| 6,503,295 B1 | 1/2003 | Koros et al. ................ 95/51 |
| 6,508,860 B1 | 1/2003 | Kulkarni et al. ............. 95/51 |
| 6,547,859 B1 * | 4/2003 | Mullhaupt et al. ............. 96/4 |
| 6,562,110 B2 | 5/2003 | Koros et al. .................. 96/4 |
| 6,579,343 B2 | 6/2003 | Brennecke et al. ............ 95/51 |
| 6,585,802 B2 | 7/2003 | Koros et al. ................ 95/51 |
| 6,605,140 B2 | 8/2003 | Fuiver et al. .................. 96/4 |
| 6,626,980 B2 | 9/2003 | Hasse et al. ................. 95/51 |
| 6,663,805 B1 | 12/2003 | Ekiner et al. ............. 264/45.9 |
| 6,726,744 B2 | 4/2004 | Kulprathipanja et al. ....... 95/45 |
| 6,740,143 B2 | 5/2004 | Corbin et al. ................ 96/11 |
| 6,755,900 B2 | 6/2004 | Koros et al. ................ 96/10 |
| 6,863,983 B2 | 3/2005 | Tsapatsis et al. ............ 428/446 |
| 6,932,859 B2 | 8/2005 | Koros et al. ................ 96/10 |
| 6,946,015 B2 | 9/2005 | Jorgensen et al. ............ 95/51 |
| 6,997,971 B1 | 2/2006 | Young et al. ................ 95/45 |
| 7,025,804 B2 | 4/2006 | Simmons et al. ............. 95/51 |
| 7,109,140 B2 | 9/2006 | Marand et al. ............... 502/4 |
| 7,138,006 B2 | 11/2006 | Miller et al. ................ 95/45 |
| 7,166,146 B2 | 1/2007 | Miller et al. ................ 95/45 |
| 2002/0053284 A1 | 5/2002 | Koros et al. ................ 95/51 |
| 2003/0220188 A1 | 11/2003 | Marand et al. ............... 502/60 |
| 2004/0107830 A1 | 6/2004 | Simmons et al. ............ 95/45 |
| 2004/0147796 A1 | 7/2004 | Roman et al. .............. 585/144 |
| 2005/0043167 A1 | 2/2005 | Miller et al. ................ 502/4 |
| 2005/0139066 A1 | 6/2005 | Miller et al. ................ 95/45 |
| 2005/0192175 A1 | 9/2005 | Yaghi et al. ................. 502/1 |
| 2005/0230305 A1 | 10/2005 | Kulkarni et al. ......... 210/500.23 |
| 2005/0268782 A1 | 12/2005 | Kulkarni et al. ............... 96/4 |
| 2006/0107830 A1 | 5/2006 | Miller et al. ................ 95/45 |
| 2006/0117949 A1 | 6/2006 | Kulkarni et al. ............. 95/45 |
| 2006/0230926 A1 * | 10/2006 | Fritsch et al. ................ 95/45 |
| 2007/0022877 A1 | 2/2007 | Marand et al. .............. 95/51 |
| 2007/0209505 A1 * | 9/2007 | Liu et al. .................... 95/45 |

FOREIGN PATENT DOCUMENTS

| EP | 1 1188 477 A1 | 3/2002 |
| WO | WO 02/088148 A1 | 11/2002 |
| WO | WO 2007/007051 A1 | 1/2007 |

OTHER PUBLICATIONS

Simard et al., J. Am. Chem. Soc., 113:4696 (1991).
Yaghi et al., Science, 295: 469 (2002).

* cited by examiner

*Primary Examiner*—Jason M Greene
(74) *Attorney, Agent, or Firm*—Mark Goldberg

(57) ABSTRACT

Metal-organic framework (MOF)-polymer mixed matrix membranes (MOF-MMMs) have been prepared by dispersing high surface area MOFs (e.g. IRMOF-1) into a polymer matrix (e.g. Matrimid 5218). The MOFs allow the polymer to infiltrate the pores of the MOFs, which improves the interfacial and mechanical properties of the polymer and in turn affects permeability. Pure gas permeation tests show the incorporation of 20 wt-% of IRMOF-1 in Matrimid 5218 polyimide matrix results in 280% improvement in $CO_2$ permeability without a loss of $CO_2/CH_4$ selectivity compared to those of the pure Matrimid 5218 membrane. This type of MOF-MMMs has significantly improved gas separation performance with dramatically high $CO_2$ permeability (>35 barrer) and higher than 29 $CO_2/CH_4$ selectivity at 50° C. under 100 psig pressure, which are attractive candidates for practical gas separation applications such as $CO_2$ removal from natural gas.

17 Claims, No Drawings

US 7,637,983 B1

METAL ORGANIC FRAMEWORK—POLYMER MIXED MATRIX MEMBRANES

BACKGROUND OF THE INVENTION

Gas separation processes with membranes have undergone a major evolution since the introduction of the first membrane-based industrial hydrogen separation process about two decades ago. The design of new materials and efficient methods will further advance the membrane gas separation processes within the next decade.

The gas transport properties of many glassy and rubbery polymers have been measured, driven by the search for materials with high permeability and high selectivity for potential use as gas separation membranes. Unfortunately, an important limitation in the development of new membranes for gas separation applications is a well-known trade-off between permeability and selectivity. By comparing the data of hundreds of different polymers, Robeson demonstrated that selectivity and permeability seem to be inseparably linked to one another, in a relation where selectivity increases as permeability decreases and vice versa.

Despite concentrated efforts to tailor polymer structure to improve separation properties, current polymeric membrane materials have seemingly reached a limit in the tradeoff between productivity and selectivity. For example, many polyimide and polyetherimide glassy polymers such as Ultem 1000 have much higher intrinsic $CO_2/CH_4$ selectivities ($\alpha_{CO2/CH4}$) (~30 at 50° C. and 100 psig) than that of cellulose acetate (~22), which are more attractive for practical gas separation applications. These polymers, however, do not have outstanding permeabilities attractive for commercialization compared to current commercial cellulose acetate membrane products, in agreement with the trade-off relationship reported by Robeson.

To enhance membrane selectivity and permeability, mixed matrix membranes (MMMs) have been developed in recent years. To date, almost all of the MMMs reported in the literature are hybrid blend membranes comprising insoluble solid domains such as molecular sieves or carbon molecular sieves embedded in a polymer matrix. For example, see U.S. Pat. No. 6,626,980; US 2003/0220188 A1; US 2005/0043167 A1; US 2002/0053284 A1; U.S. Pat. No. 6,755,900; U.S. Pat. No. 6,500,233; U.S. Pat. No. 6,503,295 and U.S. Pat. No. 6,508,860. These MMMs combine the low cost and easy processability of the polymer with the superior gas separation properties provided by the molecular sieve. These membranes have the potential to achieve higher selectivity with equal or greater permeability compared to existing polymer membranes, while maintaining their advantages. In contrast to the many studies on conventional polymers for membranes, only a few attempts to increase gas separation membrane performance with MMMs of zeolite and rubbery or glassy polymers have been reported. These MMMs have shown some promise, but there remains a need for improved membranes that combine the desired higher selectivity and permeability goals previously discussed.

In the present invention, it has been found that a new type of metal-organic framework (MOF)-polymer or metal-organic polyhedra (MOP)-polymer MMM achieves significantly enhanced gas separation performance (higher $\alpha_{CO_2/CH_4}$) compared to that of cellulose acetate membranes. MOFs such as isoreticular MOF-5 (IRMOF-1) as the dispersed filler phase in MMMs using glassy polymer such as Matrimid 5218 as the continuous polymer matrix have been prepared and the membrane properties determined.

These MOFs and similar structures were recently reported. Simard et al. reported the synthesis of an "organic zeolite", in which rigid organic units are assembled into a microporous, crystalline structure by hydrogen bonds. See Simard et al., J. AM. CHEM. SOC., 113:4696 (1991). Yaghi and co-workers and others have reported a new type of highly porous crystalline zeolite-like materials termed "metal-organic frameworks" (MOFs). These MOFs are composed of ordered arrays of rigid organic units connected to metal centers by metal-ligand bonds and they possess vast accessible surface areas. See Yaghi et al., SCIENCE, 295: 469 (2002). MOF-5 is a prototype of a new class of porous materials constructed from octahedral Zn—O—C clusters and benzene links. Most recently, Yaghi et al. reported the systematic design and construction of a series of frameworks (IRMOF) that have structures based on the skeleton of MOF-5, wherein the pore functionality and size have been varied without changing the original cubic topology. For example, IRMOF-1 ($Zn_4O(R_1—BDC)_3$) has the same topology as that of MOF-5, but was synthesized by a simplified method. In 2001, Yaghi et al. reported the synthesis of a porous metal-organic polyhedron (MOP) $Cu_{24}$(m-$BDC)_{24}(DMF)_{14}(H_2O)_{50}(DMF)_6(C_2H_5OH)_6$, termed "α-MOP-1" and constructed from 12 paddle-wheel units bridged by m-BDC to give a large metal-carboxylate polyhedron. These MOF, IR-MOF and MOP materials exhibit analogous behaviour to that of conventional microporous materials such as large and accessible surface areas, interconnected intrinsic micropores. Moreover, they also can possibly reduce the hydrocarbon fouling problem of the polyimide membranes due to the presence of pore sizes larger than those of zeolite materials. MOF, IR-MOF and MOP materials are also expected to allow the polymer to infiltrate the pores, which would improve the interfacial and mechanical properties and would in turn affect permeability. These MOF, IR-MOF and MOP materials are selected as the fillers in the preparation of new MMMs in this invention.

SUMMARY OF THE INVENTION

The present invention describes the design and preparation of a new class of metal-organic framework (MOF)-polymer MMMs containing high surface area MOF (or IRMOF or MOP, all referred to as "MOF" herein) as fillers. These MMMs incorporate the MOF fillers possessing micro- or meso-pores into a continuous polymer matrix. The MOF fillers have highly porous crystalline zeolite-like structures and exhibit behaviour analogous to that of conventional microporous materials such as large and accessible surface areas and interconnected intrinsic micropores. Moreover, these MOF fillers may reduce the hydrocarbon fouling problem of the polyimide membranes due to their relatively larger pore sizes compared to those of zeolite materials. The polymer matrix can be selected from all kinds of glassy polymers such as polyimides (e.g., Matrimid 5218 sold by Ciba Geigy), polyetherimides (e.g., Ultem 1000 sold by General Electric), cellulose acetates, polysulfone, and polyethersulfone. These MOF-polymer MMMs combine the properties of both the continuous polymer matrix and the dispersed MOF fillers. Pure gas separation experiments on these MMMs show dramatically enhanced gas separation permeability performance for $CO_2$ removal from natural gas (i.e., 2-3 orders of magnitude higher permeability than that of the continuous Matrimid 5218 polymer matrix without a loss of $CO_2$ over $CH_4$ selectivity). These separation results suggest that these new membranes are attractive candidates for practical gas separation applications such as $CO_2$ removal from natural gas.

DETAILED DESCRIPTION OF THE INVENTION

A new family of MMMs containing particular types of microporous solid materials as fillers has now been developed that retains its polymer processability with improved selectivity for gas separation due to the superior molecular sieving and sorption properties of the microporous materials. The fillers used herein are MOFs and related structures.

More particularly, the present invention pertains to MOF-polymer MMMs (or MOF-polymer mixed matrix films) containing high surface area MOF materials as fillers. These new MMMs have application for the separation of a variety of gas mixtures. One such separation that has significant commercial importance is the removal of carbon dioxide from natural gas. MMMs permit carbon dioxide to diffuse through such membranes at a faster rate than methane. Carbon dioxide has a higher permeation rate than methane because of higher solubility in the membrane, higher diffusivity, or both. Thus, the concentration of carbon dioxide enriches on the permeate side of the membrane, while methane enriches on the feed (or reject) side of the membrane.

The MOF-polymer MMMs developed in this invention have MOF fillers dispersed throughout a continuous polymer phase. The resulting membrane has a steady-state permeability different from that of the pure polymer due to the combination of the molecular sieving and sorption gas separation mechanism of the MOF filler phase with the solution-diffusion gas separation mechanism of the polymer matrix phase.

Design of the MOF-polymer MMMs containing micro- or meso-porous MOF fillers described herein is based upon the proper selection of both MOF filler and the continuous polymer matrix. Material selection for both MOF filler and the continuous polymer matrix is a key aspect for the preparation of MOF-polymer MMMs with excellent gas separation properties.

Polymers provide a wide range of properties important for separations, and modifying them can improve membrane selectivity. A material with a high glass transition temperature ($T_g$), high melting point, and high crystallinity is preferred for most gas separations. Glassy polymers (i.e., polymers below their $T_g$) have stiffer polymer backbones and therefore allow smaller molecules such as hydrogen and helium to permeate the membrane more quickly and larger molecules such as hydrocarbons to permeate the membrane more slowly.

For MOF-polymer MMM applications, it is preferred that the membrane fabricated from the pure polymer, which can be used as the continuous polymer phase in the MMMs, exhibit a carbon dioxide or hydrogen over methane selectivity of at least about 15, more preferably the selectivities are at least about 30. Preferably, the polymer used as the continuous polymer phase in the MOF-polymer MMM is a rigid, glassy polymer.

Typical polymers suitable for MOF-polymer MMM preparation as the continuous polymer phase according to the invention are selected from the group consisting of polysulfones; polystyrenes, including styrene-containing copolymers such as acrylonitrilestyrene copolymers, styrene-butadiene copolymers and styrene-vinylbenzylhalide copolymers; polycarbonates; cellulosic polymers, such as cellulose acetate, cellulose triacetate, cellulose acetate-butyrate, cellulose propionate, ethyl cellulose, methyl cellulose, nitrocellulose, etc.; polyimides, polyetherimides, and polyamides, including aryl polyamides, aryl polyimides such as Matrimid 5218 and P-84, aryl polyetherimides such as Ultem 1000; polyethers; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly (vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

In the practice of the present invention, microporous materials are defined as solids that contain interconnected pores of less than 2 nm in size and consequently, they possess large and accessible surface areas-typically 300-1500 $m^2g^{-1}$ as measured by gas adsorption. The discrete porosity provides molecular sieving properties to these materials which have found wide applications as catalysts and sorption media.

The MOFs used in the present invention are composed of rigid organic units assembled by metal-ligand bonding and possessing relatively vast accessible surface areas. MOF-5 is a prototype of a new class of porous materials constructed from octahedral Zn—O—C clusters and benzene links. Most recently, the systematic design and construction of a series of frameworks (IRMOF) that have structures based on the skeleton of MOF-5 has been reported, wherein the pore functionality and size have been varied without changing the original cubic topology. For example, IRMOF-1 ($Zn_4O(R_1—BDC)_3$) has the same topology as that of MOF-5, but was synthesized by a simplified method. In 2001, a porous metal-organic polyhedron (MOP) $Cu_{24}(m\ BDC)_{24}(DMF)_{14}(H2O)_{50}(DMF)_6(C_2H_5OH)_6$, termed "α-MOP-1" and constructed from 12 paddle-wheel units bridged by m-BDC to give a large metal-carboxylate polyhedron. These MOF, IR-MOF and MOP materials exhibit behaviour analogous to that of conventional microporous materials such as large and accessible surface areas, and interconnected intrinsic micropores. Moreover, they may reduce the hydrocarbon fouling problem of the polyimide membranes due to the pore sizes that are relatively larger than those of zeolite materials. MOF, IR-MOF and MOP materials are also expected to allow the polymer to infiltrate the pores, which would improve the interfacial and mechanical properties and would in turn affect permeability. Therefore, these MOF, IR-MOF and MOP materials (all termed "MOF" herein this invention) are selected as the fillers in the preparation of new MMMs here in this invention. These MOFs, or metal-organic framework materials have very high surface areas per unit volumes, and have very high porosities. MOFs are a new type of porous materials which have a crystalline structure comprising repeating units having a metal or metal oxide with a positive charge and organic units having a balancing counter charge. MOFs provide for pore sizes that can be controlled with the choice of organic structural unit, where larger organic structural units can provide for larger pore sizes. The characteristics for a given gas mixture is dependent on the materials in the MOF, as well as the size of the pores created. Structures and building units for MOFs can be found in US 2005/0192175 A1 published on Sep. 1, 2005 and WO 02/088148 A1 published on Nov. 7, 2002, both of which are incorporated by reference in their entireties.

The materials of use for the present invention include MOFs with a plurality of metal, metal oxide, metal cluster or metal oxide cluster building units, hereinafter referred to as metal building units, where the metal is selected from the transition metals in the periodic table, and beryllium. Preferred metals include zinc (Zn), cadmium (Cd), mercury (Hg), and beryllium (Be). The metal building units are linked by organic compounds to form a porous structure, where the organic compounds for linking the adjacent metal building units include 1,3,5-benzenetribenzoate (BTB); 1,4-benzenedicarboxylate (BDC); cyclobutyl 1,4-benzenedicarboxylate (CB BDC); 2-amino 1,4 benzenedicarboxylate (H2N BDC); tetrahydropyrene 2,7-dicarboxylate (HPDC); terphenyl dicarboxylate (TPDC); 2,6 naphthalene dicarboxylate (2,6-NDC); pyrene 2,7-dicarboxylate (PDC); biphenyl dicarboxylate (BDC); or any dicarboxylate having phenyl compounds.

Specific materials that show improvement in properties have a three-dimensional extended porous structure and include: MOF-177, a material having a general formula of $Zn_4O(1,3,5\text{-benzenetribenzoate})_2$; MOF-5, also known as IRMOF-1, a material having a general formula of $Zn_4O(1,4\text{-benzenedicarboxylate})_3$; IRMOF-6, a material having a general formula of $Zn_4O(\text{cyclobutyl 1,4-benzenedicarboxylate})$; IRMOF-3, a material having a general formula of $Zn_4O(2\text{-amino 1,4 benzenedicarboxylate})_3$; and IRMOF-11, a material having a general formula of $Zn_4O(\text{terphenyl dicarboxylate})_3$, or $Zn_4O(\text{tetrahydropyrene 2,7-dicarboxylate})_3$; and IRMOF-8, a material having a general formula of $Zn_4O(2,6\text{ naphthalene dicarboxylate})_3$.

Representative examples of carboxylate links for MOF materials include the following:

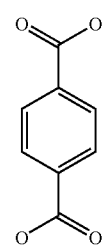

R₁-BDC

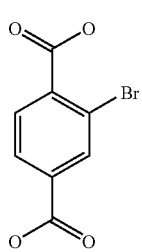

R₂-BDC

-continued

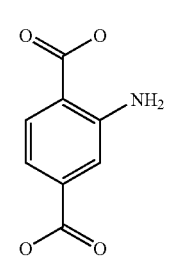

R₃-BDC

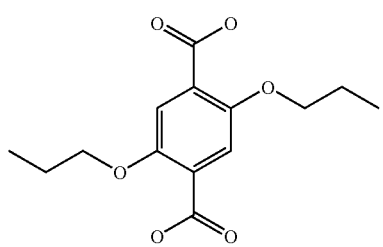

R₄-BDC

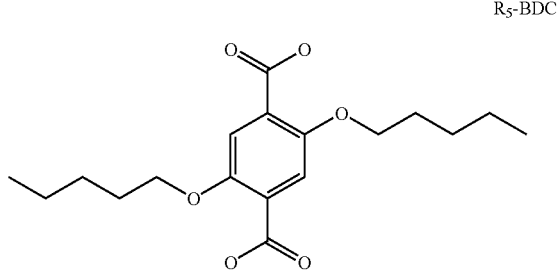

R₅-BDC

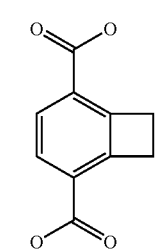

R₆-BDC

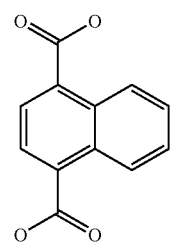

R₇-BDC

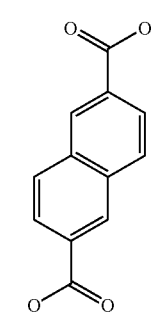

2,6-NDC

-continued

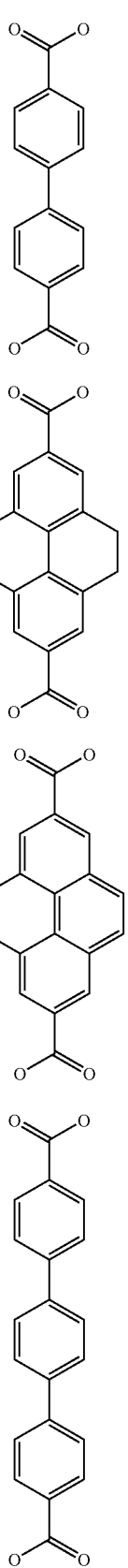

BPDC

HPDC

PDC

TPDC

For example, for the synthesis of IRMOF-1, an N,N'-diethylformamide (DEF) solution mixture of $Zn(NO_3)_2 \cdot 4H_2O$ and the acid form of 1,4-benzenedicarboxylate (BDC) are heated at 105° C. for 20 hours in a closed vessel to give crystalline IRMOF-1, $Zn_4O(H-BDC)_3$ in 90% yield.

MOF-polymer MMMs containing MOF fillers were fabricated by mixing MOF fillers in a continuous polymer matrix comprising a polymer in a solvent. The most preferred MOF-polymer MMMs used in this present invention were fabricated as follows. MOF-polymer mixed matrix dense films were prepared from a solution casting of a slurry solution containing MOF fillers and a continuous polymer matrix. The loading of the MOF fillers in the mixed matrix dense films can be varied from 1 to 50 wt-%. Matrimid 5218 or Ultem 1000 polymer was dissolved in a suitable solvent at room temperature to form a homogeneous polymer solution. A measured amount of dry MOF materials such as IRMOF-1 was then added, and the resulting slurry was stirred and ultrasonicated three times to ensure good dispersion. The weight of MOF added to the polymer matrix is expressed as a percent of the pure polymer, e.g. 20%-IRMOF-1-Matrimid represents 0.20 grams IRMOF-1 combined with 1.00 grams of Matrimid. The slurry solution was poured into a glass ring on top of a clean glass plate, and dried at room temperature. The resulting dried films were detached from the glass plate and were further dried at room temperature for at least 24 hours and then at 110° C. for at least 48 hours under high vacuum. The MMM films were 1-3 mils thick, measured with a micrometer. They were cut into small circles for gas separation measurements using a dense film test unit.

The permeability (P) and selectivity ($\alpha_{CO_2/CH_4}$) of the MOF-polymer MMMs (or mixed matrix dense films) with microporous polymer fillers were measured by pure gas measurements at 50° C. under ~100 psig pressure. For both the $CO_2$ and $CH_4$ gases tested, the MOF-polymer mixed matrix dense films containing MOF fillers offer dramatically enhanced permeability (2-3 orders of improvement) compared to that of pure polymer matrix as shown in Table 1. These results indicate that the intrinsic gas transport properties of the MOF fillers and polymer matrix phase determine the effective extremely high P of the MOF-polymer mixed matrix dense films. For example, as shown in Table 1, the $P_{CO2}$ of 20%-IRMOF-1-Matrimid mixed matrix dense film with 20 wt-% of IRMOF-1 ($P_{CO2}$=38.8 barrer) increased 288% over that of pure Matrimid 5218 dense film ($P_{CO2}$=10.0 barrer), and the $\alpha_{CO_2/CH_4}$ (29.2) remained as high as that of a Matrimid 5218 dense film (28.2). In addition, the solubility selectivity ($S_{CO2}/S_{CH4}$) of the 20%-IRMOF-1-Matrimid 5218 film increased compared to that of the pure Matrimid 5218 film (Table 2).

Pure gas permeation tests indicate that the MOF-polymer MMMs with significantly enhanced permeability are attractive candidates for practical gas separation applications such as $CO_2$ removal from natural gas.

TABLE 1

Gas Separation Results of Matrimid 5218 and IRMOF-1-Matrimid 5218 Mixed Matrix Dense Films*

| | Permeability (P, barrer) | | | |
|---|---|---|---|---|
| Film | $P_{CO2}$ | $P_{CO2}$ increased | $P_{CH4}$ | Selectivity ($\alpha_{CO_2/CH_4}$) |
| Pure Matrimid 5218 | 10.0 | — | 0.355 | 28.2 |
| 20%-IRMOF-1-Matrimid 5218[b] | 38.8 | 288% | 1.33 | 29.2 |

TABLE 1-continued

Gas Separation Results of Matrimid 5218 and
IRMOF-1-Matrimid 5218 Mixed Matrix Dense Films*

| Film | Permeability (P, barrer) | | | Selectivity ($\alpha_{CO_2/CH_4}$) |
|---|---|---|---|---|
| | $P_{CO_2}$ | $P_{CO_2}$ increased | $P_{CH_4}$ | |
| 30% $Cu_3(BTC)_2$-MOF-Matrimid 5218[c] | 22.1 | 121% | 0.741 | 29.8 |

*Testing conditions: Pure gas permeation, 50° C., ~100 psig. 1 barrer = $10^{-10}$ $cm^3(STP) \cdot cm/cm^2 \cdot sec \cdot cmHg$.
[b]Nano-IRMOF-1 was synthesized according to the literature procedure (Huang, et al., MICROPOR. MESOPOR. MATER., 58:105-114 (2003)).
[c]$Cu_3(BTC)_2$-MOF was synthesized according to the literature procedure (Millward, et al., J. AM. CHEM. Soc.., 127:17998-17999 (2005)).

TABLE 2

Solubility Selectivity, Diffusivity Selectivity, and Permselectivity of
Matrimid 5218 and IRMOF-1-Matrimid
5218 Mixed Matrix Dense Films *

| Film | Solubility selectivity ($S_{CO_2}/S_{CH_4}$) | Diffusivity selectivity ($D_{CO_2}/D_{CH_4}$) | Permselectivity ($\alpha_{CO_2/CH_4}$) |
|---|---|---|---|
| Matrimid 5218 | 4.21 | 6.68 | 28.2 |
| 20%-IRMOF-1-Matrimid 5218 | 4.36 | 6.69 | 29.2 |

As shown in Table 3, the $P_{CO_2}$ of 20% nano-IRMOF-1-Matrimid 5218 MMM (20 wt % of nano-IRMOF-1 dispersed in Matrimid 5218 polymer matrix) increased 16% without loss of $\alpha_{CO_2/CH_4}$ compared to the pure Matrimid 5218 polymer membrane. The $P_{CO_2}$ of 30% $Cu_3(BTC)_2$-MOF-Matrimid 5218 MMM (30 wt % of $Cu_3(BTC)_2$ dispersed in Matrimid 5218 polymer matrix) increased 121% without loss of $\alpha_{CO_2/CH_4}$ compared to the pure Matrimid 5218 polymer membrane. The results in Table 4 show that the $P_{CO_2}$ of 10% IRMOF-1-Ultem 1000 MMM (10 wt % of IRMOF-1 dispersed in Ultem 1000 polymer matrix) increased 44% without a significant decrease in $\alpha_{CO_2/CH_4}$ compared to the pure Ultem 1000 polymer membrane. The $P_{CO_2}$ of 20% IRMOF-1-Ultem 1000 MMM (20 wt % of IRMOF-1 dispersed in Ultem 1000 polymer matrix) increased 55% without a significant decrease in $\alpha_{CO_2/CH_4}$ compared to the pure Ultem 1000 polymer membrane.

TABLE 3

Pure gas permeation results of Matrimid 5218 membrane and
MOF-Matrimid 5218 mixed matrix membranes for $CO_2/CH_4$ separation [a]

| Film | $P_{CO_2}$ (barrer) | $P_{CO_2}$ increase | $P_{CH_4}$ (barrer) | $\alpha_{CO_2/CH_4}$ |
|---|---|---|---|---|
| Matrimid 5218 | 10.0 | — | 0.355 | 28.2 |
| 20% nano-IRMOF-1-Matrimid 5218 [b] | 11.6 | 16% | 0.394 | 29.4 |
| 30% $Cu_3(BTC)_2$-MOF-Matrimid 5218 [c] | 22.1 | 121% | 0.741 | 29.8 |

[a] Testing conditions: Pure gas permeation, 50° C., 100 psig; 1 barrer = $10^{-10}$ $cm^3(STP) \cdot cm/cm^2 \cdot sec \cdot cmHg$.
[b] Nano-IRMOF-1 was synthesized according to the literature procedure (Huang, et al., MICROPOR. MESOPOR. MATER., 58:105-114 (2003)).
[c] $Cu_3(BTC)_2$-MOF was synthesized according to the literature procedure (Millward, et al., J. AM. CHEM. Soc.., 127:17998-17999 (2005)).

TABLE 4

Pure gas permeation results of Ultem 1000 membrane and
MOF-Ultem 1000 mixed matrix membranes for $CO_2/CH_4$ separation [a]

| Film | $P_{CO_2}$ (barrer) | $P_{CO_2}$ increase | $P_{CH_4}$ (barrer) | $\alpha_{CO_2/CH_4}$ |
|---|---|---|---|---|
| Ultem 1000 | 1.95 | — | 0.0644 | 30.3 |
| 10% IRMOF-1-Ultem 1000 | 2.81 | 44% | 0.101 | 27.8 |
| 20% IRMOF-1-Ultem 1000 | 2.97 | 52% | 0.113 | 26.3 |

[a] Testing conditions: Pure gas permeation, 50° C., 100 psig; 1 barrer = $10^{-10}$ $cm^3(STP) \cdot cm/cm^2 \cdot sec \cdot cmHg$.

For $H_2/CH_4$ separation, the MOF-polymer MMM containing MOF fillers dispersed in the continuous polymer matrices offer dramatically enhanced $H_2$ permeability without significant loss in $H_2/CH_4$ selectivity compared to those of pure polymer matrix.

For example, as shown in Table 5, the $P_{H_2}$ of 20% IRMOF-1-Matrimid 5218 MMM (20 wt % of IRMOF-1 dispersed in Matrimid 5218 polymer matrix) increased 247% without loss of $\alpha_{CO_2/CH_4}$ compared to the pure Matrimid 5218 polymer membrane. The $P_{H_2}$ of 30% $CU_3(BTC)_2$-MOF-Matrimid MMM with 30 wt % of $Cu_3(BTC)_2$ dispersed in Matrimid polymer matrix increased 102% without loss of $\alpha_{H_2/CH_4}$ compared to the pure Matrimid polymer membrane. The results in Table 6 show that the $P_{H_2}$ of 20% IRMOF-1-Ultem 1000 MMM with 20 wt % of IRMOF-1 dispersed in Ultem 1000 polymer matrix increased 51% with less than 15% loss in $\alpha H_2/CH_4$ compared to the pure Ultem 1000 polymer membrane.

TABLE 5

Pure gas permeation results of Matrimid 5218 membrane and
MOF-Matrimid 5218 mixed matrix membranes for $H_2/CH_4$ separation [a]

| Film | $P_{CH_4}$ (barrer) | $P_{H_2}$ (barrer) | $P_{H_2}$ increase | $\alpha_{H_2/CH_4}$ |
|---|---|---|---|---|
| Matrimid 5218 | 0.355 | 33.1 | — | 93.2 |
| 20% IRMOF-1-Matrimid 5218 | 1.33 | 114.9 | 247% | 86.4 |
| 30% $Cu_3(BTC)_2$-MOF-Matrimid 5218 | 0.741 | 66.9 | 102% | 90.3 |

[a] Testing conditions: Pure gas permeation, 50° C., 100 psig; 1 barrer = $10^{-10}$ $cm^3(STP) \cdot cm/cm^2 \cdot sec \cdot cmHg$.
[b] Nano-IRMOF-1 was synthesized according to the literature procedure (Huang, et al., MICROPOR. MESOPOR. MATER., 58:105-114 (2003)).
[c] $Cu_3(BTC)_2$-MOF was synthesized according to the literature procedure (Millward, et al., J. AM. CHEM. Soc.., 127:17998-17999 (2005)).

TABLE 6

Pure gas permeation results of Ultem 1000 membrane and
MOF-Ultem 1000 mixed matrix membranes for $H_2/CH_4$ separation [a]

| Film | $P_{CH_4}$ (barrer) | $P_{H_2}$ (barrer) | $P_{H_2}$ increase | $\alpha_{H_2/CH_4}$ |
|---|---|---|---|---|
| Ultem 1000 | 0.0644 | 11.2 | — | 174.4 |
| 20% IRMOF-1-Ultem 1000 | 0.113 | 16.9 | 51% | 149.3 |

[a] Testing conditions: Pure gas permeation, 50° C., 100 psig; 1 barrer = $10^{-10}$ $cm^3(STP) \cdot cm/cm^2 \cdot sec \cdot cmHg$.

The MOF-polymer MMMs described in this invention can be widely used for a variety of liquid and gas separations such as alcohol/water, $CO_2/CH_4$, $H_2/CH_4$, $O_2/N_2$, $CO_2/N_2$, olefin/paraffin, iso/normal paraffins, polar molecules such as $H_2O$, $H_2S$, and $NH_3$/mixtures with $CH_4$, $N_2$, $H_2$, and other light gases separations.

What is claimed is:

1. A process for separating at least one gas from a mixture of gases, the process comprising:
   a) providing a mixed matrix gas separation membrane comprising a metal organic framework (MOF) material dispersed in a continuous phase consisting essentially of a polymer which is permeable to said at least one gas;
   b) contacting the mixture on one side of the mixed matrix membrane to cause said at least one gas to permeate the mixed matrix membrane; and
   c) removing from the opposite side of the membrane a permeate gas composition comprising a portion of said at least one gas which permeated said membrane.

2. The process of claim 1 wherein said MOF comprises a systematically formed metal-organic framework having a plurality of metal, metal oxide, metal cluster or metal oxide cluster building units, and an organic compound linking adjacent building units, wherein the linking compound comprises a linear dicarboxylate having at least one substituted phenyl group.

3. The process of claim 2 wherein the MOFs are selected from the group consisting of MOF-5, a material having a general formula of $Zn_4O(1,4\text{-benzenedicarboxylate})_3$; IRMOF-6, a material having a general formula of $Zn_4O(cyclobutyl\ 1,4\text{-benzenedicarboxylate})$; IRMOF-3, a material having a general formula of $Zn_4O(2\text{-amino }1,4\text{ benzenedicarboxylate})_3$; and IRMOF-11, a material having a general formula of $Zn_4O(terphenyl\ dicarboxylate)_3$, or $Zn_4O(tetrahydropyrene\ 2,7\text{-dicarboxylate})_3$; IRMOF-8, a material having a general formula of $Zn_4O(2,6\ naphthalene\ dicarboxylate)_3$, and mixtures thereof.

4. The process of claim 2 wherein the MOF is MOF-5 and has a general formula of $Zn_4O(1,4\text{-benzenedicarboxylate})_3$ with a three-dimensional extended porous structure.

5. The process of claim 2 wherein the MOF is MOF-177 and has a general formula of $Zn_4O(1,3,5\text{-benzenetribenzoate})_3$ with a three-dimensional extended porous structure.

6. The process of claim 1 wherein said continuous phase comprises one or more polymers selected from the group consisting of polysulfones; poly(styrenes), styrene-containing copolymers, polycarbonates; cellulosic polymers, polyimides, polyetherimides, and polyamides, aryl polyamides, aryl polyimides, aryl polyetherimides; polyethers; poly(arylene oxides); poly(esteramide-diisocyanate); polyurethanes; polyesters, polysulfides; poly(ethylene), poly(propylene), poly(butene-1), poly(4-methyl pentene-1), polyvinyls, polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above polymers.

7. The process of claim 6 wherein said continuous phase comprises one or more polymers selected from the group consisting of polyimides, polyetherimides, and polyamides.

8. The process of claim 1 wherein said mixture of gases comprises a pair of gases selected from the group consisting of hydrogen/methane, carbon dioxide/methane, carbon dioxide/nitrogen, oxygen/nitrogen, methane/nitrogen and olefin/paraffin.

9. A mixed matrix membrane comprising a continuous phase organic polymer and an MOF dispersed in said continuous phase organic polymer.

10. The mixed matrix membrane of claim 9 wherein said MOF comprises a systematically formed metal-organic framework having a plurality of metal, metal oxide, metal cluster or metal oxide cluster building units, and an organic compound linking adjacent building units, wherein the linking compound comprises a linear dicarboxylate having at least one substituted phenyl group.

11. The mixed matrix membrane of claim 10 wherein the MOFs are selected from the group consisting of MOF-5, a material having a general formula of $Zn_4O(1,4\text{-benzenedicarboxylate})_3$; IRMOF-6, a material having a general formula of $Zn_4O(cyclobutyl\ 1,4\text{-benzenedicarboxylate})$; IRMOF-3, a material having a general formula of $Zn_4O(2\text{-amino }1,4\ benzenedicarboxylate)_3$; and IRMOF-11, a material having a general formula of $Zn_4O(terphenyl\ dicarboxylate)_3$, or $Zn_4O(tetrahydropyrene\ 2,7\text{-dicarboxylate})_3$; IRMOF-8, a material having a general formula of $Zn_4O(2,6\ naphthalene\ dicarboxylate)_3$, and mixtures thereof.

12. The mixed matrix membrane of claim 9 wherein the MOF is MOF-5 and has a general formula of $Zn_4O(1,4\text{-benzenedicarboxylate})_3$ with a three-dimensional extended porous structure.

13. The mixed matrix membrane of claim 9 wherein the MOF is MOF-177 and has a general formula of $Zn_4O(1,3,5\text{-benzenetribenzoate})_3$ with a three-dimensional extended porous structure.

14. The mixed matrix membrane of claim 9 wherein said continuous phase comprises one or more polymers selected from the group consisting of polysulfones; poly(styrenes), styrene-containing copolymers, polycarbonates; cellulosic polymers, polyimides, polyetherimides, and polyamides, aryl polyamides, aryl polyimides, aryl polyetherimides; polyethers; poly(arylene oxides); poly(esteramide-diisocyanate); polyurethanes; polyesters, polysulfides; poly(ethylene), poly(propylene), poly(butene-1), poly(4-methyl pentene-1), polyvinyls, polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above polymers.

15. The mixed matrix membrane of claim 9 wherein said continuous phase comprises one or more polymers selected from the group consisting of polyimides, polyetherimides, and polyamides.

16. A process for preparation of a mixed matrix membrane comprising:
   a) forming a polymer solution by mixing a polymer selected from the group consisting of polysulfones; poly(styrenes), styrene-containing copolymers, polycarbonates; cellulosic polymers, polyimides, polyetherimides, and polyamides, aryl polyamides, aryl polyimides, aryl polyetherimides; polyethers; poly(arylene oxides); poly(esteramide-diisocyanate); polyurethanes; polyesters, polysulfides; poly(ethylene), poly(propylene), poly(butene-1), poly(4-methyl pentene-1), polyvinyls, polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above polymers with a solvent;
   b) forming an MOF-polymer slurry by mixing said polymer solution with at least one MOF comprising a systematically formed metal-organic framework having a plurality of metal, metal oxide, metal cluster or metal oxide cluster building units, and an organic compound linking adjacent building units, wherein the linking compound comprises a linear dicarboxylate having at least one substituted phenyl group; and c) casting said MOF-polymer slurry as a thin layer upon a substrate followed by evaporating the solvents in the thin layer, or followed by evaporating the solvents in the thin layer and then immersing the thin layer into a coagulation bath to form an MOF-polymer mixed matrix membrane.

17. The process of claim 16 wherein said polymer is selected from the group consisting of polyimides, polyetherimides, and polyamides.

* * * * *

UNITED STATES PATENT AND TRADEMARK OFFICE
CERTIFICATE OF CORRECTION

| | | |
|---|---|---|
| PATENT NO. | : 7,637,983 B1 | Page 1 of 1 |
| APPLICATION NO. | : 11/427834 | |
| DATED | : December 29, 2009 | |
| INVENTOR(S) | : Liu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this

Ninth Day of November, 2010

David J. Kappos
*Director of the United States Patent and Trademark Office*